US010642497B2

(12) United States Patent
Maghraoui et al.

(10) Patent No.: US 10,642,497 B2
(45) Date of Patent: May 5, 2020

(54) SYSTEM, METHOD AND COMPUTER PROGRAM PRODUCT FOR INSTANTIATING BLOCKS OF A SOLID-STATE DISK TO INCLUDE DIFFERENT FLASH CHARACTERISTICS

(71) Applicant: International Business Machines Corporation, Armonk, NY (US)

(72) Inventors: Kaoutar El Maghraoui, Yorktown Heights, NY (US); Hubertus Franke, Cortlandt Manor, NY (US); Hillery C. Hunter, Chappaqua, NY (US); Gokul Bhargava Kandiraju, Briarcliff Manor, NY (US); Hartmut Erhard Penner, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 15/252,328

(22) Filed: Aug. 31, 2016

(65) Prior Publication Data

US 2018/0059932 A1 Mar. 1, 2018

(51) Int. Cl.
G06F 3/06 (2006.01)
G06F 12/02 (2006.01)

(52) U.S. Cl.
CPC .............. G06F 3/061 (2013.01); G06F 3/064 (2013.01); G06F 3/0679 (2013.01); G06F 12/0246 (2013.01); G06F 2212/7201 (2013.01)

(58) Field of Classification Search
CPC .................. G06F 12/0246; G06F 2212/72
See application file for complete search history.

(56) References Cited

U.S. PATENT DOCUMENTS

| 8,117,374 B2 | 2/2012 | Kim et al. |
| 8,555,000 B2 | 10/2013 | Jo et al. |
| 2006/0179212 A1* | 8/2006 | Kim .................... G06F 12/0246 711/103 |

(Continued)

FOREIGN PATENT DOCUMENTS

KR 10-2013-0063244 A 6/2013

OTHER PUBLICATIONS

Mel, et al. "The NIST Definition of Cloud Computing". Recommendations of the National Institute of Standards and Technology. Nov. 16, 2015.

(Continued)

Primary Examiner — Edward J Dudek, Jr.
Assistant Examiner — Andrew Russell
(74) Attorney, Agent, or Firm — Daniel P. Morris; McGinn IP Law Group, PLLC

(57) ABSTRACT

A flash translation layer method, system, and computer program product, include sending a request with a type of feature and a flash characteristic of a translation table for a Solid-State disk, receiving, via a meta-flash translation layer (meta-FTL), the request and checking for a number of free blocks in a NAND chip, and instantiating a range in the NAND chip including the number of free blocks using the meta-FTL to create a compatible range of blocks for the type of feature and the flash characteristic of the translation table if the checking returns a confirmation that the number of free blocks is available.

20 Claims, 5 Drawing Sheets

(56) References Cited

U.S. PATENT DOCUMENTS

| | | | |
|---|---|---|---|
| 2011/0060887 A1* | 3/2011 | Thatcher | G06F 3/0604 |
| | | | 711/171 |
| 2012/0221771 A1 | 8/2012 | Yoon et al. | |
| 2013/0212320 A1 | 8/2013 | Lee et al. | |
| 2013/0311707 A1 | 11/2013 | Kawamura et al. | |
| 2013/0326119 A1 | 12/2013 | Lee et al. | |
| 2013/0332684 A1 | 12/2013 | Kandiraju et al. | |
| 2017/0242722 A1* | 8/2017 | Qiu | G06F 3/061 |
| 2017/0344285 A1* | 11/2017 | Choi | G06F 3/0619 |

OTHER PUBLICATIONS

Gokul B. Kandiraju, et al.. "A Flexible OS-based Approach for Characterizing Solid-State Disk Endurance". IBM T.J Watson Research Center. 2012.

Sang-Phil Lim, et al.. "FASTer FTL for Enterprise-Class Flash Memory SSDs". International Workship on Storage Network Architecture and Parallel I/Os. 2010.

* cited by examiner

SYSTEM, METHOD AND COMPUTER PROGRAM PRODUCT FOR INSTANTIATING BLOCKS OF A SOLID-STATE DISK TO INCLUDE DIFFERENT FLASH CHARACTERISTICS

BACKGROUND

The present invention relates generally to a flash translation layer method, and more particularly, but not by way of limitation, to a system, method, and computer program product for instantiating a range of blocks on a Solid-State Disk (SSD) such that each type of the flash characteristics can be included in the SSD.

A Flash Translation Layer (FTL) is a piece of software that runs on Solid-State Disks (SSDs) to manage the translation of the logical block numbers to physical block numbers, wear-leveling, garbage collection, etc. Conventionally, SSDs have a single FTL running as a microcode for the entire SSD that manages all the negative-AND (NAND) blocks in a similar manner. In other words, the conventional FTL's allocate free blocks of the NAND to perform a feature (e.g., encryption, metrics, compression, etc.) according to the one flash characteristic of the translation table (e.g., page level tables, block level tables, hybrid FTL tables, etc.).

However, the conventional SSDs do not allow the flexibility of using the SSD in a heterogeneous manner, for various purposes. That is, conventional FTLs on the SSDs cannot be dynamically "programmed" and heterogeneous FTLs cannot be dynamically instantiated on a single SSD.

Thus, the needs in the art include the needs to instantiate a range of free blocks of the NAND for a particular feature and translation table such that multiple types of features and translation table formats can run on a single SSD to enable next generation data centers and software-defined environments where FTL can receive commands from the higher levels software and dynamically orchestrate the storage for given requirements.

SUMMARY

In an exemplary embodiment, the present invention can provide a computer-implemented flash translation layer method, the method including sending a request with a type of feature and a flash characteristic of a translation table for a Solid-State disk, receiving, via a meta-flash translation layer (meta-FTL) the request and checking for a number of free blocks in a NAND chip, and instantiating a range in the NAND chip comprising the number of free blocks using the meta-FTL to create a compatible range of blocks for the type of feature and the flash characteristic of a translation table if the checking returns a confirmation that the number of free blocks are available.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
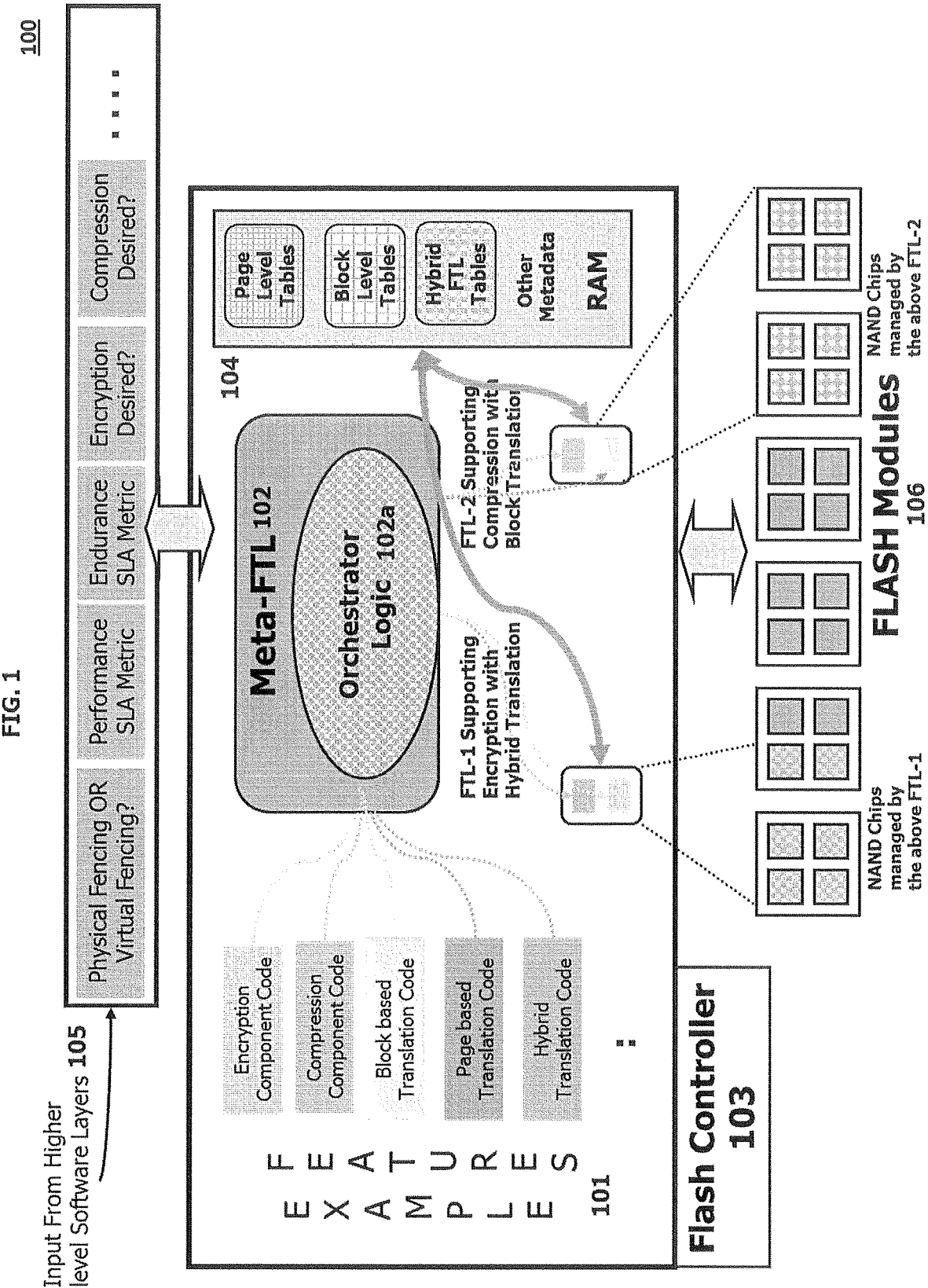
FIG. 1 depicts a flash translation layer system 100 according to an embodiment of the present invention.

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 2:
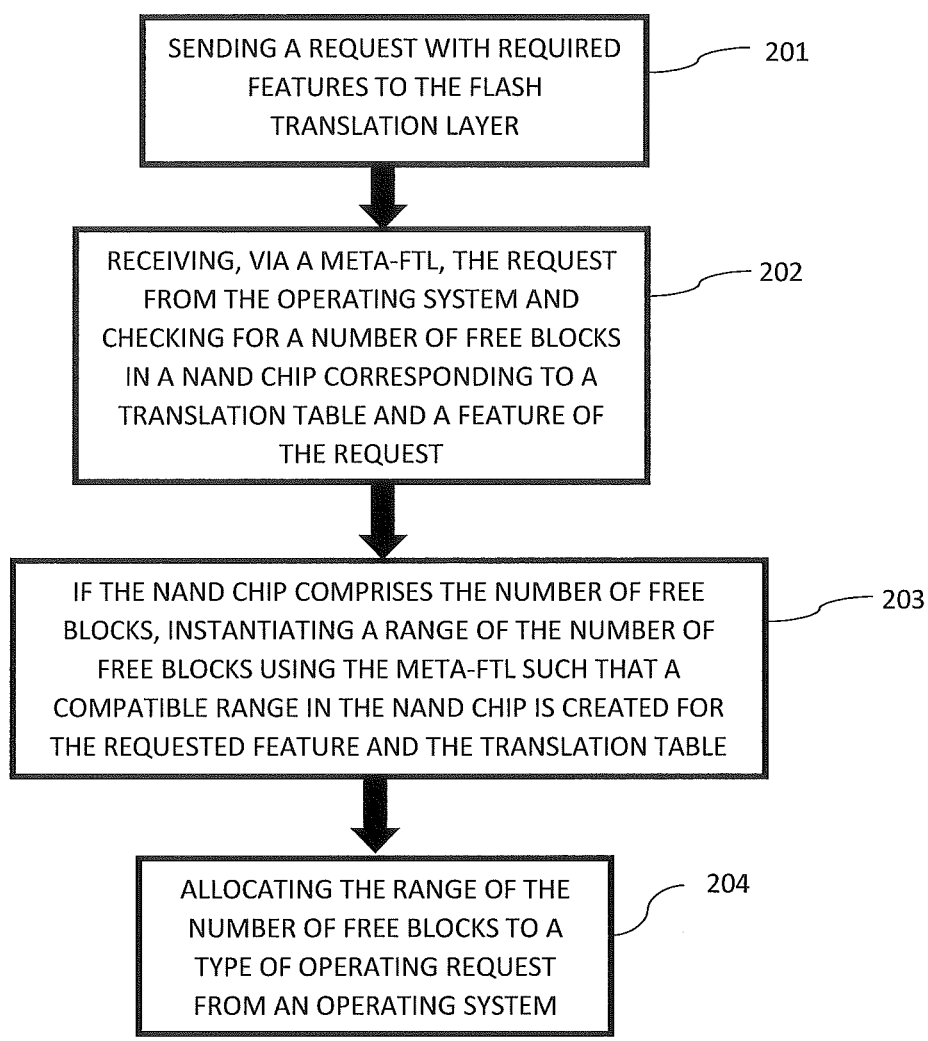
FIG. 2 depicts a flow chart for a flash translation layer method 100 according to an embodiment of the present invention.

With reference now to the examples depicted in FIG. 1 and FIG. 2, the flash translation layer method 200 includes various steps to instantiate a range of free blocks on a NAND for a feature and a translation table such that a plurality of types of features and a plurality of types of translations tables can be present on a single SSD. As shown in at least FIG. 3, one or more computers of a computer system 12 according to an embodiment of the present invention can include a memory 28 having instructions stored in a storage system to perform the steps of FIG. 1.

Although one or more embodiments (see e.g., FIGS. 3-5) may be implemented in a cloud environment 50 (see e.g., FIG. 4), it is nonetheless understood that the present invention can be implemented outside of the cloud environment.

Referring to FIG. 1 and FIG. 2, in step 201, a request is sent from an operating system as an input from higher-level software layers 105 to a flash controller 103 with a type of feature 101 and a flash characteristic of a translation table 104 for a Solid-State disk. For example, the request can comprise a request for physical fencing or virtual fencing, performance service level agreement (SLA) metrics, endurance SLA metrics, an encryption request, a compression request, etc. The type of feature 101 of the request signals to the meta-FTL 102 what type of function is desired to be performed using the orchestrator logic 102a (e.g., the pre-programmed software to perform the feature). The features can comprise an encryption component code, a compression component code, a block based translation code, a page based translation code, a hybrid translation code, etc. The flash characteristic of the translation table 104 comprises the format of the NAND chip. For example, the translation table can include a page level table, a block level table, a hybrid level table, etc. for the NAND chip.

In step 202, the meta-FTL 102 receives the request from the operating system and checks the flash modules 106 (e.g., the NAND chips) if there are a number of free blocks available to for the type of feature and the flash characteristic of the translation table in the NAND chip. For example, each SSD has a limited capacity such that the meta-FTL 102 checks whether the flash modules comprise an amount of free space available such that the free space can be partitioned by the instantiating in step 203 (as described later).

In step 203, a range in the NAND chip comprising the number of free blocks is instantiated using the meta-FTL 102 to create a compatible range of blocks for the type of feature and the flash characteristic of the translation table if the checking returns a confirmation that the number of free blocks is available. As exemplarily shown in FIG. 1, the meta-FTL 102 can instantiate a first range of blocks FTL-1 in the flash module 106 to support encryption (e.g., a type of feature 101) with hybrid translation (e.g., a flash characteristic of the translation table 104) and a second range of blocks FTL-2 in the flash module 106 to support compression (e.g., a type of feature 101) with block translation (e.g., a flash characteristic of the translation table 104). That is, the instantiated region can have multiple areas carved out with different or same (for isolation) properties.

It is noted that the entirety of the flash modules (e.g., the six modules exemplarily shown in FIG. 1) are partitioned by the instantiating such that a first partition comprises FTL-1 and a second partition comprises FTL-2. The un-partitioned blocks of the NAND chips in the flash modules comprise a number of free blocks that can be instantiated based on step 202 confirming that the number of free blocks comprises enough memory for the new request. That is, each of the partitions comprises a potentially different type of flash characteristic of the translation table 104.

In other words, the blocks of the NAND chip are created for the format of the request. Step 203 can create the range of the NAND chips which can be used for a particular feature (e.g, encryption, compression, page based). It is noted that even after the instantiating, the range of blocks of the NAND chip is free space such that in Step 104, the blocks can be allocated for a request from the operating system (e.g., read, write, etc.). That is, the instantiating merely instantiate (e.g., initializes) the blocks of the NAND chip such that the allocating can perform the function requested by the operating system.

In step 204, the instantiated range in the NAND chip is allocated for an operation request of an operating system. That is, steps 201-203 initialize the NAND chips such that in step 204 the conventional operations of the SSD can be performed by allocating the partitioned NAND chip for the operation such as read, write, encryption, compression, etc. In step 204, the features can be activated to perform the function of the feature using the translation table such as reading from the range of blocks when the operating system requests to read the number of blocks.

Thereby, using generic code for features such as encryption, compression, different kinds of translation, performance and endurance optimized code, the meta-FTL may dynamically "glue" together the generic code components into separate partitioned via the instantiating in step 203 to orchestrate an FTL for a defined purpose. For example, the meta-FTL may also partition SSD and assign a new partition to an instantiated FTL if isolation is a strict requirement for a client.

Thus, dynamic orchestration/carving of optimized storage for an application within an SSD, a provision for isolation of storage in multi-tenancy environment within a single SSD, incorporating new features/code into the Meta-FTL having this ability for more enhanced FTLs, an SSD that can serve a mix of requirements that a tenant/application can choose, etc. may be provided by use of the embodiments described herein. The invention is flexible to meet the client's needs especially in environment where the applications are dynamic and the requirements may not be completely (or even partially) know.

In some embodiments, the FTL described above can be implemented such that each feature will may a code component associated with it, a Client/Application/Global orchestration layer will communicate the requirements using the protocol, which are received by the Meta-FTL, the orchestration layer 102*a* in the meta-FTL 102 will glue together required code components for to satisfy application request, reserve memory and NAND Flash resources and instantiate an FTL. The meta-FTL 102 may then communicate back to the applications/clients and also directs all the operating system to the FTL. When the use is complete, on a specific protocol command, the instantiated FTL may be deleted and the resources are released.

It is noted that a block may include many pages. The blocks are conventionally programmed as only one of "page level tables", "block level tables", "hybrid FTL tables", etc. (e.g., flash characteristics). Each type of programming of the RAM requires a different type of programming code. However, by instantiating a range of the blocks according to one of the exemplary embodiments herein, a single SSD can include each of the different flash characteristics which utilize the conventional code.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Figure 3:
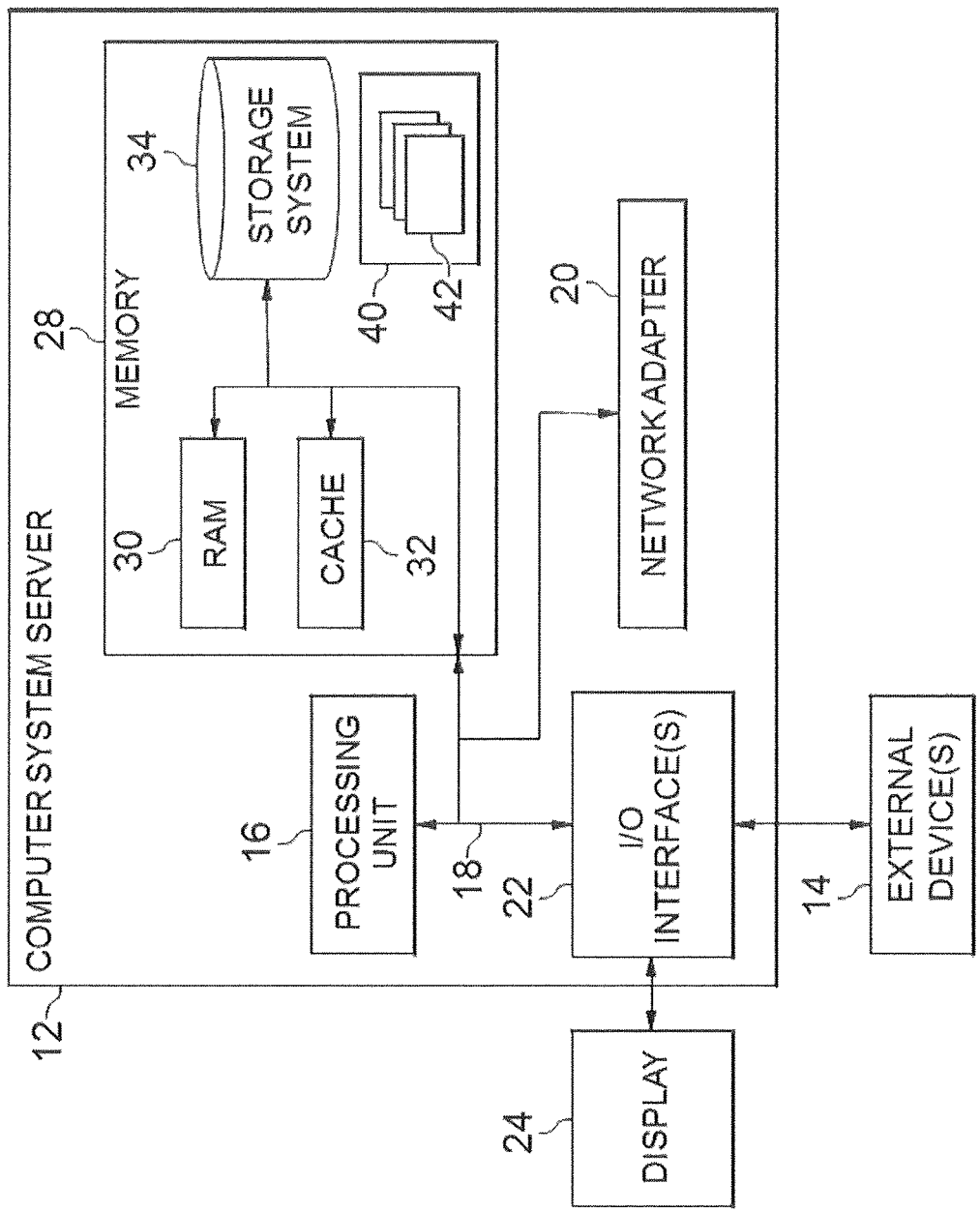
FIG. 3 depicts a cloud computing node 10 according to an embodiment of the present invention.

Referring now to FIG. 3, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
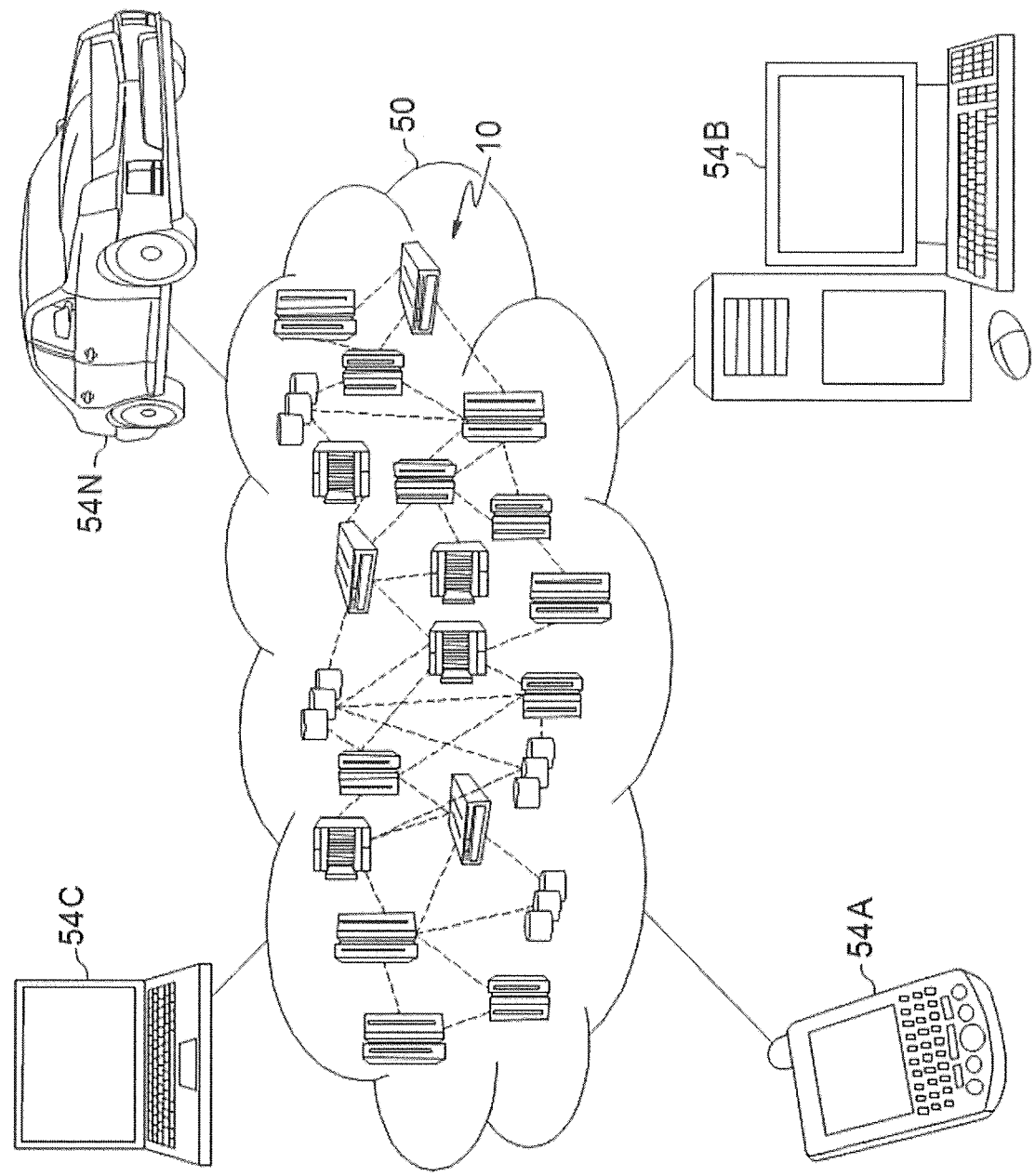
FIG. 4 depicts a cloud computing environment 50 according to an embodiment of the present invention.

Referring now to FIG. 4, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud-computing environment 50 can communicate with any type of computerized circuit over any type of network and/or network addressable connection (e.g., using a web browser).

Figure 5:
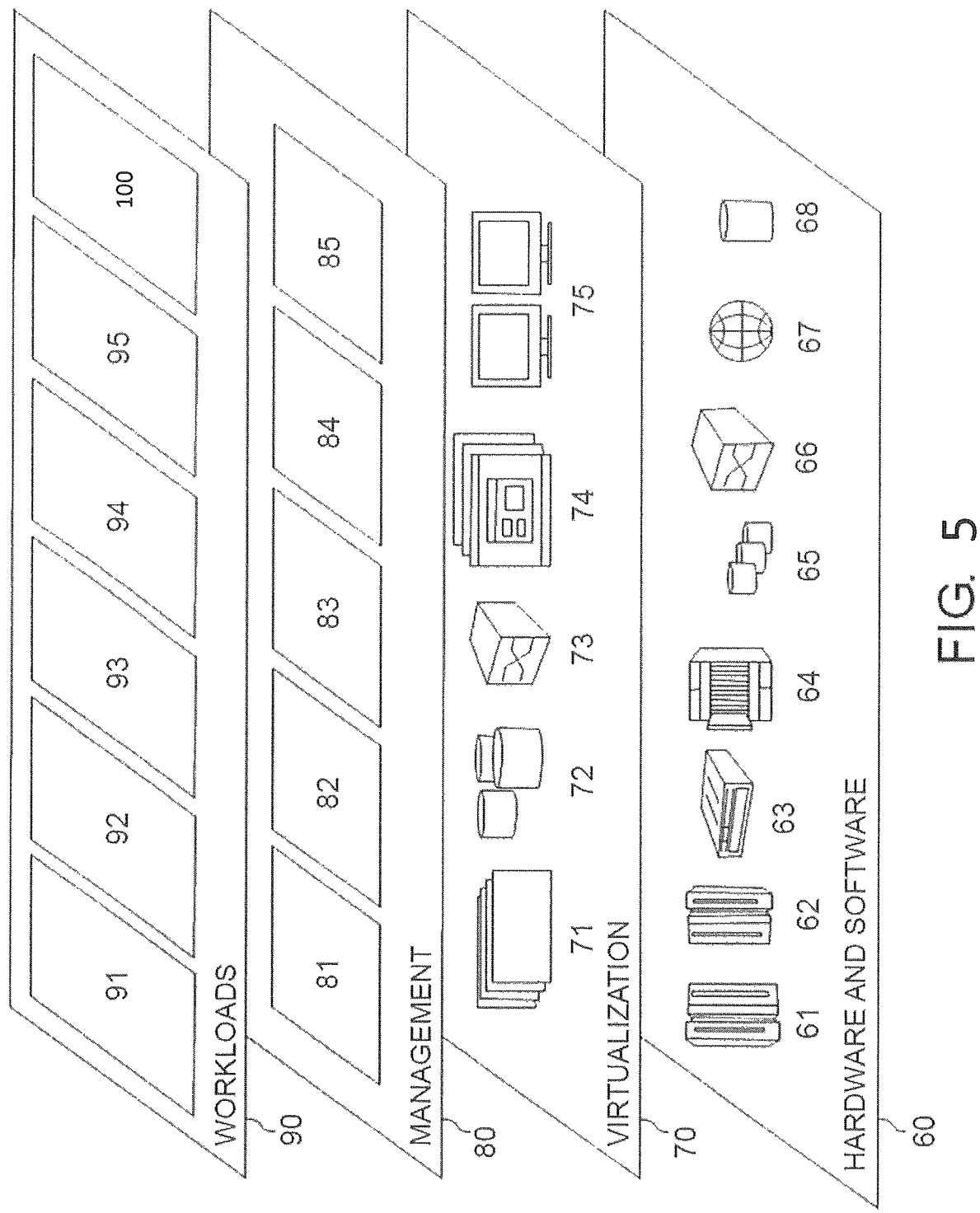
FIG. 5 depicts abstraction model layers according to an embodiment of the present invention.

Referring now to FIG. 5, an exemplary set of functional abstraction layers provided by cloud-computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the flash translation layer method 100.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented flash translation layer method, the method comprising:
sending a request with a type of feature and a flash characteristic of a translation table for a Solid-State disk;
receiving, via a meta-flash translation layer (meta-FTL), the request and checking for a number of free blocks in a NAND chip;
performing a virtualization of the meta-flash translation layer by:
instantiating a range in the NAND chip comprising the number of free blocks using the meta-FTL to create a compatible range of blocks for the type of feature and the flash characteristic of the translation table if the checking returns a confirmation that the number of free blocks is available; and instantiating a second range in the NAND chip comprising a second number of free blocks using the meta-FTL to create a second compatible range of blocks for a second type of feature and a second flash characteristic of the translation table; and dynamically programming data on the fly based on an input requirement of the request into the range and the second range, wherein the type of feature comprises a first type of feature, wherein the second type of feature comprises a different feature than the first type of feature, and wherein the meta-flash translation layer comprises a plurality of data structures.

2. The computer-implemented method of claim 1, further comprising allocating the instantiated range in the NAND chip for an operation request of an operating system.

3. The computer-implemented method of claim 2, wherein the allocating allocates the instantiated range using pre-programed software code for the operation request of the type of feature.

4. The computer-implemented method of claim 1, wherein the instantiating creates the instantiated range in the NAND chip as a partitioned segment of a total number of blocks of the NAND chip.

5. The computer-implemented method of claim 4, wherein the second range comprises a second partitioned segment of the total number of blocks of the NAND chip.

6. The computer-implemented method of claim 5, wherein the partitioned segment and the second partitioned segment comprise a different type of flash characteristic.

7. The computer-implemented method of claim 1, wherein the flash characteristic of the translation table comprises a format for a mapping function of the NAND chip.

8. The computer-implemented method of claim 1, implemented in a cloud-computing environment.

9. The computer-implemented method of claim 1, wherein the second type and the first type comprise a different type of flash characteristic of the translation table.

10. The computer-implemented method of claim 1, wherein the first range in the NAND chip and the second range in the NAND chip are allocated for a request from an operating system.

11. The computer-implemented method of claim 1, wherein the first range in the NAND chip and the second range in the NAND chip are allocated for a different function performed by an operating system.

12. The computer-implemented method of claim 1, wherein the type of feature and the second type of feature are based on a desired type of function for the range and the second range in the NAND chip.

13. The computer-implemented method of claim 1, further comprising instantiating a third range in the NAND chip comprising a third number of free blocks using the meta-FTL to create a third compatible range of blocks for a third type of feature and a third flash characteristic of the translation table, wherein the flash characteristic and the second flash characteristic include a same flash characteristic, and wherein the second flash characteristic and the third flash characteristic include a different flash characteristic.

14. A computer program product for a flash translation layer of a Solid-State disk, the computer program product comprising a computer-readable storage medium having program instructions embodied therewith, the program instructions executable by a computer to cause the computer to perform:

sending a request with a type of feature and a flash characteristic of a translation table for the Solid-State disk;

receiving, via a meta-flash translation layer (meta-FTL), the request and checking for a number of free blocks in a NAND chip;

performing a virtualization of the meta-flash translation layer by:

instantiating a range in the NAND chip comprising the number of free blocks using the meta-FTL to create a compatible range of blocks for the type of feature and the flash characteristic of the translation table if the checking returns a confirmation that the number of free blocks is available; and instantiating a second range in the NAND chip comprising a second number of free blocks using the meta-FTL to create a second compatible range of blocks for a second type of feature and a second flash characteristic of the translation table; and dynamically programming data on the fly based on an input requirement of the request into the range and the second range, wherein the type of feature comprises a first type of feature, wherein the second type of feature comprises a different feature than the first type of feature, and wherein the meta-flash translation layer comprises a plurality of data structures.

15. The computer-program product of claim 14, further comprising allocating the instantiated range in the NAND chip for an operation request of an operating system.

16. The computer-program product of claim 15, wherein the allocating allocates the instantiated range using pre-programed software code for the operation request of the type of feature.

17. The computer-program product of claim 14, wherein the instantiating creates the instantiated range in the NAND chip as a partitioned segment of a total number of blocks of the NAND chip.

18. The computer-program product of claim 17, wherein the second range comprises a second partitioned segment of the total number of blocks of the NAND chip.

19. A flash translation layer system, said system comprising:

a processor; and a memory, the memory storing instructions to cause the processor to:

send a request with a type of feature and a flash characteristic of a translation table for a Solid-State disk;

receive, via a meta-flash translation layer (meta-FTL) the request and checking for a number of free blocks in a NAND chip;

performing a virtualization of the meta-flash translation layer by:

instantiating a range in the NAND chip comprising the number of free blocks using the meta-FTL to create a compatible range of blocks for the type of feature and the flash characteristic of the translation table if the checking returns a confirmation that the number of free blocks is available; and instantiating a second range in the NAND chip comprising a second number of free blocks using the meta-FTL to create a second compatible range of blocks for a second type of feature and a second flash characteristic of the translation table; and dynamically program data on the fly based on an input requirement of the request into the range and the second range, wherein the type of feature comprises a first type of feature, wherein the second type of feature comprises a different feature than the first type of feature, and wherein the meta-flash translation layer comprises a plurality of data structures.

20. The system of claim 19, implemented in a cloud-computing environment.

* * * * *